United States Patent
Buglione et al.

[11] Patent Number: 5,845,731
[45] Date of Patent: Dec. 8, 1998

[54] HYBRID MOTOR VEHICLE

[75] Inventors: Arthur J. Buglione, White Lake Township; Thomas S. Moore, Northville, both of Mich.

[73] Assignee: Chrysler Corporation, Auburn Hills, Mich.

[21] Appl. No.: 678,356

[22] Filed: Jul. 2, 1996

[51] Int. Cl.[6] .................................................. B60K 9/04
[52] U.S. Cl. ........................ 180/65.2; 180/65.4; 290/4 C
[58] Field of Search ................................. 180/65.1, 65.2, 180/65.3, 65.4, 65.6; 290/4 R, 4 C

[56] References Cited

U.S. PATENT DOCUMENTS

| | | |
|---|---|---|
| 2,803,975 | 8/1957 | Akerman et al. ................ 180/65.2 X |
| 3,792,327 | 2/1974 | Waldorf . |
| 3,813,557 | 5/1974 | Traeger . |
| 3,837,419 | 9/1974 | Nakamura . |
| 3,874,472 | 4/1975 | Deane . |
| 3,886,810 | 6/1975 | Sugiyama et al. . |
| 3,923,115 | 12/1975 | Helling . |
| 3,994,354 | 11/1976 | Haumaier . |
| 4,109,743 | 8/1978 | Brusaglino et al. . |
| 4,131,171 | 12/1978 | Keyes . |
| 4,148,192 | 4/1979 | Cummings . |
| 4,165,795 | 8/1979 | Lynch et al. . |
| 4,306,156 | 12/1981 | Monaco et al. . |
| 4,309,620 | 1/1982 | Bock . |
| 4,335,429 | 6/1982 | Kawakatsu ................ 180/65.2 X |
| 4,336,856 | 6/1982 | Gamell . |
| 4,351,405 | 9/1982 | Fields et al. . |
| 4,405,029 | 9/1983 | Hunt . |
| 4,407,132 | 10/1983 | Kawakatsu et al. . |
| 4,438,342 | 3/1984 | Kenyon . |
| 4,444,285 | 4/1984 | Stewart et al. . |
| 4,470,476 | 9/1984 | Hunt . |
| 4,495,451 | 1/1985 | Barnard . |
| 4,533,011 | 8/1985 | Heidemeyer et al. . |
| 4,583,505 | 4/1986 | Frank et al. . |
| 4,588,040 | 5/1986 | Albright, Jr. et al. . |
| 4,597,563 | 7/1986 | Barnard . |
| 4,631,456 | 12/1986 | Drescher et al. . |
| 4,680,986 | 7/1987 | Elsner . |
| 4,888,949 | 12/1989 | Rogers . |
| 4,900,962 | 2/1990 | Hockney et al. . |
| 4,953,646 | 9/1990 | Kim . |
| 4,961,352 | 10/1990 | Downer et al. . |
| 5,125,469 | 6/1992 | Scott ..................................... 180/65.2 |
| 5,172,784 | 12/1992 | Varela, Jr. . |
| 5,193,634 | 3/1993 | Masut . |
| 5,249,637 | 10/1993 | Heidl et al. . |
| 5,255,733 | 10/1993 | King . |
| 5,291,975 | 3/1994 | Johnson et al. . |
| 5,301,764 | 4/1994 | Gardner . |
| 5,318,142 | 6/1994 | Bates et al. . |
| 5,319,273 | 6/1994 | Hockney et al. . |
| 5,323,868 | 6/1994 | Kawashima . |
| 5,327,987 | 7/1994 | Abdelmalek . |
| 5,337,848 | 8/1994 | Bader . |
| 5,343,970 | 9/1994 | Severinsky . |
| 5,345,761 | 9/1994 | King et al. . |
| 5,350,031 | 9/1994 | Sugiyama et al. . |
| 5,353,656 | 10/1994 | Hawkey et al. . |
| 5,372,213 | 12/1994 | Hasebe et al. . |

(List continued on next page.)

OTHER PUBLICATIONS

Popular Science Magazine, Emerging Technologies for the Supercar, Jun. 1994.
NASA Tech Briefs, The Digest of New Technology, Jun. 1995, vol. 19, No. 6, pp. 12 and 13.

*Primary Examiner*—Brian L. Johnson
*Assistant Examiner*—Michael Mar
*Attorney, Agent, or Firm*—Mark P. Calcaterra

[57] ABSTRACT

A hybrid powertrain system for a motor vehicle includes a final drive unit for providing tractive power to wheels of a motor vehicle, a first motor/generator operatively connected in series to a heat engine of the motor vehicle, a second motor/generator operatively connected in series to the first motor/generator and the final drive unit, and an energy storage device operatively connected in parallel to the first motor/generator and the second motor/generator.

6 Claims, 4 Drawing Sheets

U.S. PATENT DOCUMENTS

| | | |
|---|---|---|
| 5,396,140 | 3/1995 | Goldie et al. . |
| 5,415,245 | 5/1995 | Hammond . |
| 5,427,194 | 6/1995 | Miller . |
| 5,433,282 | 7/1995 | Moroto et al. . |
| 5,442,288 | 8/1995 | Fenn et al. . |
| 5,465,015 | 11/1995 | Anastas et al. . |
| 5,492,189 | 2/1996 | Kriegler et al. . |
| 5,492,192 | 2/1996 | Brooks et al. . |
| 5,495,907 | 3/1996 | Data . |
| 5,495,912 | 3/1996 | Gray, Jr. et al. . |
| 5,667,029 | 9/1997 | Urban et al. ............................ 180/65.2 |

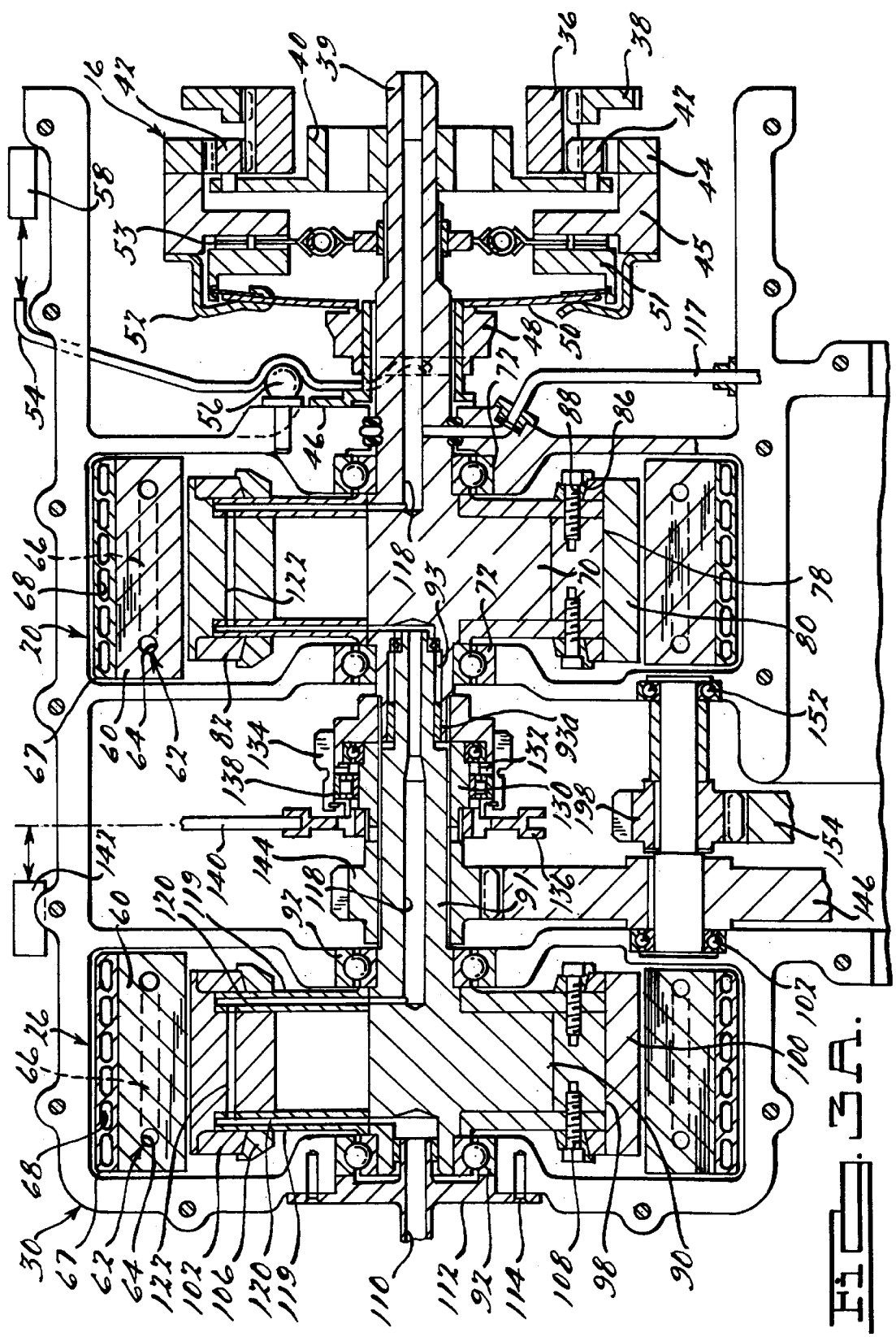

| Vehicle Mode | PROPULSION SYSTEM MODES | | | | |
|---|---|---|---|---|---|
| | Engine 12 | Clutch 18 | Motor Generator 20 | Clutch 24 | Motor Generator 26 |
| Stop | Idle<br>Running *<br>Off | Open<br>Closed<br>Open/Closed | Off<br>Charging<br>Off | Open<br>Open<br>Open | Off<br>Off<br>Off |
| Low Speed Light Accel. | Idle<br>Running *<br>Off | Open<br>Closed<br>Open/Closed | Off<br>Charging<br>Off | Open<br>Open<br>Open | Motor<br>Motor<br>Motor |
| Low Speed Heavy Accel. | Idle/Off | Open | Motor | Closed | Motor |
| Cruise Low Speed | Off<br>Running * | Open/Closed<br>Closed | Off<br>Charging | Open<br>Open | Motor<br>Motor |
| Cruise High Speed | Running<br>Running | Closed<br>Closed | Off<br>Charging * | Closed<br>Closed | Off<br>Off |
| High Speed Accel. | Running | Closed | Motor | Closed | Motor |
| Decel. (All Speeds) | Running *<br>Idle<br>Idle<br>Off<br>Off | Closed<br>Open<br>Open<br>Open<br>Closed | Charging<br>Off<br>Charging<br>Charging<br>Off | Open<br>Open<br>Closed<br>Closed<br>Open | Charging<br>Charging<br>Charging<br>Charging<br>Charging |

*Depending On Electrical Storage Device Need For Charging

FIG. 4.

HYBRID MOTOR VEHICLE

BACKGROUND OF THE INVENTION

1. Field of the Invention

The present invention relates generally to motor vehicles and, more particularly, to a hybrid powertrain system for a motor vehicle.

2. Description of the Related Art

Motor vehicles employing hybrid powertrain systems to drive the vehicle are well known in the art. Generally, the hybrid powertrain system is in either a series or parallel hybrid configuration. Typically, a series hybrid configuration includes a hydrocarbon fuel storage, a heat engine, a generator or pump, an energy storage and management system, a propulsion motor, and a final drive unit all functionally connected in series to move the vehicle. The series hybrid configuration is more efficient for city driving but suffers from the disadvantage of being less efficient for highway driving.

Typically, a parallel hybrid configuration includes a hydrocarbon fuel storage, a heat engine, a generator or pump that also functions as a propulsion motor, an energy storage and management system, a transmission and a final drive unit. These components are arranged such that there exists functionally parallel paths from the heat engine and propulsion motor to move the vehicle. The parallel hybrid configuration is more efficient for highway driving but suffers from the disadvantage of being less efficient for city driving. Thus, there is a need in the art to provide a motor vehicle having a hybrid powertrain system which embodies the best features of both the series and parallel hybrid configurations.

SUMMARY OF THE INVENTION

It is, therefore, one object of the present invention to provide a new and improved hybrid motor vehicle.

It is another object of the present invention to provide a motor vehicle having a hybrid powertrain system which employs features of both series and parallel hybrid configurations.

It is yet another object of the present invention to provide a motor vehicle that can operate in either a series hybrid configuration or a parallel hybrid configuration.

It is still another object of the present invention to provide for powering various accessory systems of a motor vehicle from a hybrid powertrain system.

It is a further object of the present invention to package the motor/generators and related gearing, clutches and actuators in the same area of a vehicle normally used for a conventional transmission.

It is yet a further object of the present invention to optimize power output of a hybrid powertrain system such that the components thereof are equally sized and more efficient.

One advantage of the present invention is that a new and improved hybrid motor vehicle is provided. Another advantage of the present invention is that the motor vehicle has a hybrid powertrain system which combines both series and parallel hybrid configurations such that the motor vehicle can choose to run as either a series or parallel hybrid vehicle at different operating times. Yet another advantage of the present invention is that the hybrid motor vehicle is more efficient because it can choose to operate in a series hybrid configuration during city driving or in a parallel hybrid configuration during highway driving. Still another advantage of the present invention is that the hybrid powertrain system of the motor vehicle powers various accessory systems. A further advantage of the present invention is that the power output of the hybrid powertrain system is optimized by equally sizing the components thereof.

The present invention is applicable in function to any one of the hybrid energy mediums and related storage systems available to motor vehicle propulsion, such as electrical, fluids, electro-chemical, mechanical, etc. The present invention is a hybrid powertrain system for a motor vehicle including a final drive unit for providing tractive power to wheels of the motor vehicle, a first motor/generator operatively connected in series to a heat engine of the motor vehicle, a second motor/generator operatively connected in series to the first motor/generator and the final drive unit, and an energy storage device operatively connected in parallel to the first motor/generator and the second motor/generator.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3A and 3B are fragmentary views of the boxed portion 2 of the hybrid powertrain system of FIG. 1.

FIG. 4 is a chart of vehicle modes versus propulsion system modes for the motor vehicle and hybrid powertrain system of FIG. 1.

DESCRIPTION OF THE PREFERRED EMBODIMENT(S)

Figure 1:
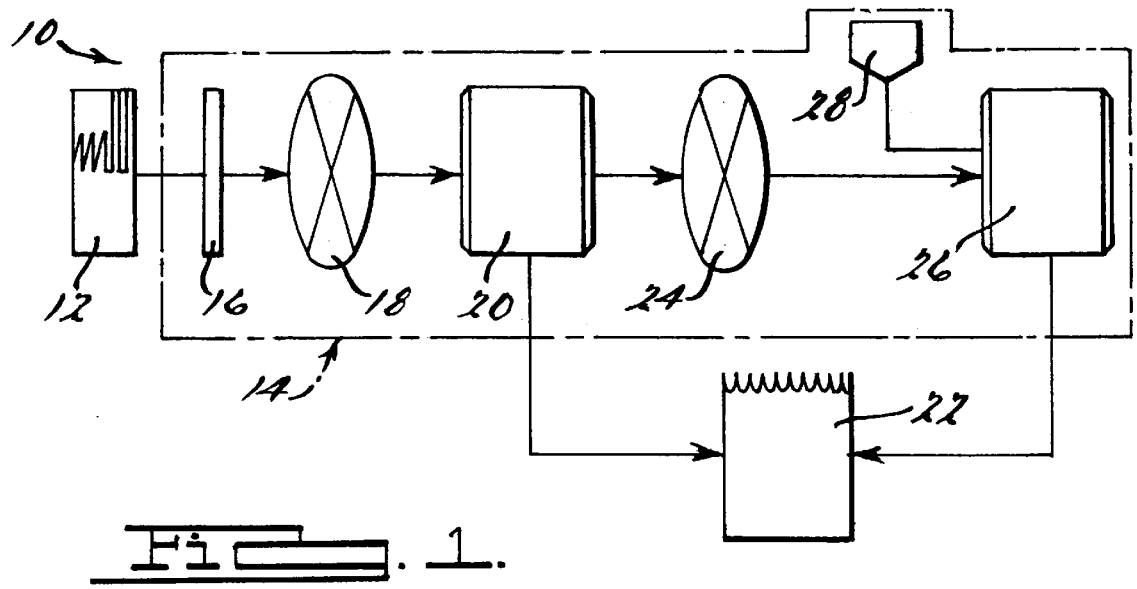
FIG. 1 is a diagrammatic view of a motor vehicle having a hybrid powertrain system according to the present invention.

Referring to FIG. 1, a hybrid motor vehicle, according to the present invention, is generally shown at 10. The hybrid motor vehicle 10 includes a power source such as a heat engine 12 mounted on a vehicle frame (not shown). The heat engine 12 produces force by the conversion of chemical energy in a hydrocarbon fuel from a hydrocarbon fuel storage (not shown) on the vehicle 10 to mechanical energy of motion (kinetic energy). The heat engine 12 is typically an internal combustion engine. The hybrid motor vehicle 10 also includes at least two, preferably four wheels (not shown) operatively mounted to the vehicle frame for rolling engagement with a surface such as a road as is known in the art. The hybrid motor vehicle 10 further includes a hybrid powertrain system, according to the present invention and generally indicated at 14, mounted to the vehicle frame and interconnecting the heat engine 12 and the wheels. The hybrid powertrain system 14 eventually transmits the force produced by the heat engine 12 to the wheels to provide movement of the vehicle 10.

Referring to FIGS. 1, 2, 3A and 3B, the hybrid powertrain system 14 includes a gearset 16 connected to the heat engine 12, a first clutch 18 operatively connected in series to the gearset 16 and a first motor/generator 20 operatively connected in series to the first clutch 18. The hybrid powertrain system 14 further includes a second clutch 24 operatively connected in series to the first motor/generator 20 and a second motor/generator 26 operatively connected in series to the second clutch 24. The hybrid powertrain system 14 also includes a bidirectional energy storage device 22 connected in parallel to the first motor/generator 20 and the second motor/generator 26. The energy storage device 22 is preferably at least one battery. The energy storage device 22 may be other than batteries, such as flywheels, ultra capacitors and the like for storing electrical energy produced by the first motor/generator 20 and the second motor/generator 26.

The hybrid powertrain system 14 includes a final drive unit 28 operatively connected in series to the second motor/generator 26. The final drive unit 28 can be a one or multiple speed unit and includes a final drive ratio and differential unit operatively connected to the vehicle driving wheels.

Figure 2:
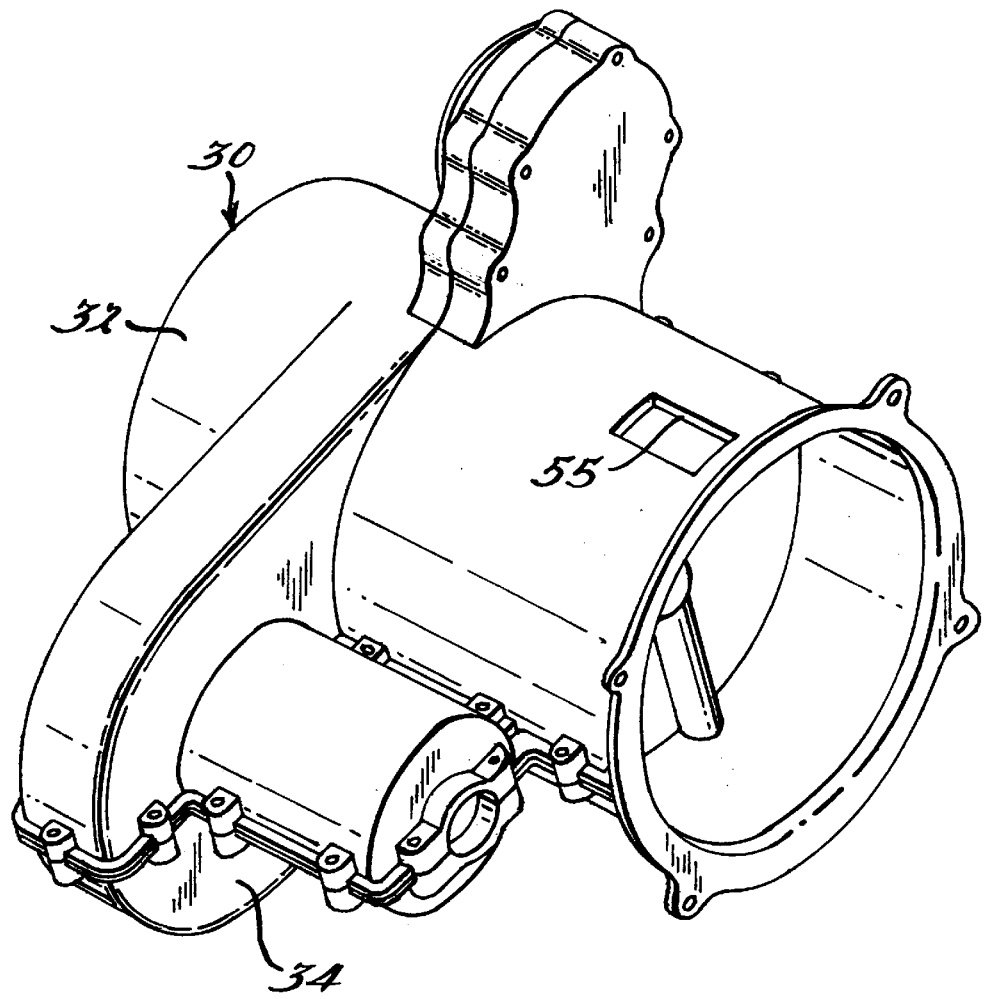
FIG. 2 is a perspective view of a boxed portion 2 of the hybrid powertrain system of FIG. 1.
Figure 3B:
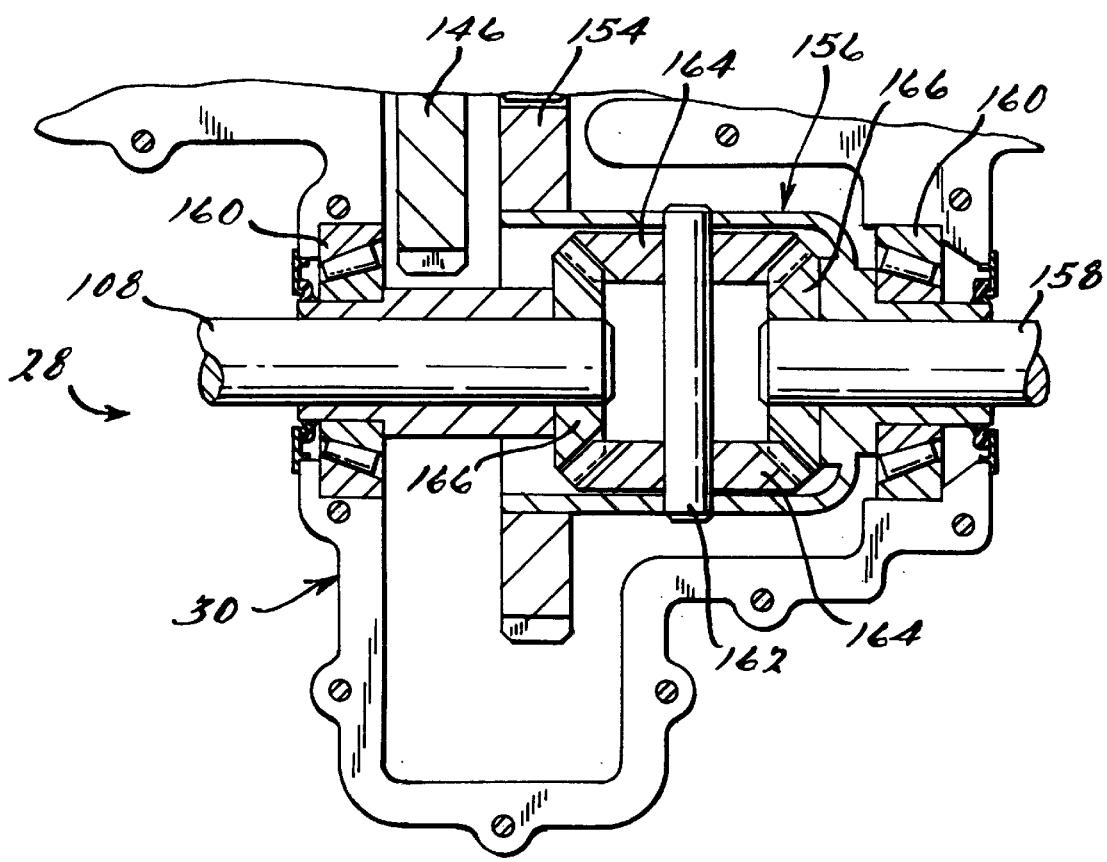

Referring to FIGS. 2, 3A and 3B, the gearset 16, first clutch 18, first motor/generator 20, second clutch 24, second motor/generator 26 and final drive unit 28 are contained within a case or housing, generally indicated at 30. The housing 30 has a split case construction for facilitating assembly and installation of the components of the hybrid powertrain system 14, preferably a two piece construction formed by an upper half housing 32 and a lower half housing 34 secured together by suitable mans such as fasteners (not shown). The housing 30 is generally cylindrical in shape and extends longitudinally. The housing 30 is made of a lightweight, strong metal material such as aluminum.

At one end of the housing 30, the heat engine 12 is connected to the gearset 16. The gearset 16 includes a sun gear 36 fixed rotationally by a retaining member 38 mounted on a rear face of the heat engine 12. The gearset 16 also includes a planetary carrier 40 having a plurality of pinion gears 42 disposed symmetrically and circumferentially about the sun gear 36. The planetary carrier 40 is connected to the power output shaft (not shown) of the heat engine 12 by suitable means such as fasteners (not shown). The gearset 16 further includes a ring gear 44 surrounding the pinion gears 42 and fastened to a "T" sectioned toridal mass 45 that serves as both an engine flywheel and a contact surface of the first clutch 18. Due to the fixed and unmovable sun gear 36, the planetary carrier 40 rotates with the power output shaft of the heat engine 12, forcing each pinion gear 42 to rotate as it meshes with the sun gear 36, which causes each pinion gear 42 to rotate about its own axis on the planetary carrier 40, causing the ring gear 44 to rotate faster and in the same rotational direction as the planetary carrier 40. The gearset 16, providing higher rotational output speeds to the mass 45 than the input speed from the heat engine 12, is an overdrive design to provide for compensating the speed mismatch between the most efficient operating speeds of the heat engine 12 and the most efficient operating speeds of the motor/generators 20 and 26. It should be appreciated that in this case where the gearset design and application is one of overdrive, the mass 45, attached to the gearset output, provides the same rotational inertia energy storage using less mass and volume than that of a larger mass and volume flywheel attached directly to the heat engine power output shaft.

The first clutch 18 includes a hub member 46 disposed about the shaft 39 and secured to the housing 30 with fasteners (not shown). The first clutch 18 includes a clutch release bearing 48 disposed about and moveable axially along the hub member 46. The first clutch 18 includes a clutch release plate 50 disposed about the shaft 39 and a pressure plate 51 disposed about the shaft 39 and which rotates with the clutch release plate 50 and the mass 45 via a retainer member 52. The first clutch 18 includes a clutch disk 53 which is connected to the shaft 39 by suitable means such as a spline connection and allowed to move axially.

The first clutch 18 includes a lever 54 extending through an aperture 55 (FIG. 2) in the housing 30 and abutting a pivot 56 which is attached to the housing 30. The first clutch 18 includes an external actuator 58 such as a linear actuator to move the lever 54 about the pivot 56, in turn, moving the bearing 48 in the opposite direction to open (disengage) or close (engage) the first clutch 18. It should be appreciated that when the first clutch 18 is closed, the gearset 16, through the planetary carrier 40, pinion gears 42, ring gear 44, mass 45, pressure plate 51 and clutch disk 53 provide output from the heat engine 12 to the shaft 39. It should also be appreciated that when the first clutch 18 is closed, or partially closed, power from shaft 39 is controlled and transmitted to the heat engine 12. Such a circumstance provides for starting a dormant heat engine 12, thereby eliminating the cost, complexity, and weight of an independent starting motor for the heat engine 12.

Within the housing 30, the first motor/generator 20 and second motor/generator 26 each include a plurality of stator windings 60 disposed circumferentially therein and connected to a source of power such as a power controller (not shown) for the energy storage device 22. The stator windings 60 are each made of copper and are insulated from each other by a non-conducting, non-magnetic compound such as epoxy poured in a liquid form into the stator windings 60 and then allowed to harden by curing. Passing of current through the stator windings 60 creates a magnetic field which extends radially inwardly. The first motor/generator 20 and second motor/generator 26 each include a cooling circuit, generally indicated at 62, to cool the stator windings 60. The cooling circuit 62 has at least one, preferably a pair of axially spaced conduits 64 extending circumferentially, having a plurality of axially extending and circumferentially spaced conduits 66 interconnecting the conduits 64. The cooling circuit 62 also has a cooling jacket 67 disposed about the circumference of the stator windings 60. The cooling jacket 67 has at least one, preferably a plurality of axially spaced passages 68 extending circumferentially. The conduits 64 and cooling jacket 67 each have an inlet (not shown) and an outlet (not shown) for allowing a coolant fluid from a source to enter and exit the conduits 64 and cooling jacket 67 to cool the stator windings 60. It should be appreciated that the conduits 64,66 and cooling jacket 67 are made of thin walled stainless steel tubing which is electrically isolated in a conventional manner.

The first motor/generator 20 includes a rotor 70 extending longitudinally and about the shaft 39. The rotor 70 and shaft 39 are supported by bearings 72 disposed between the housing 30 and the shaft 39. The rotor 70 includes a plurality of slots 78 and electrically conductive bars 80 forced therein. The electrically conductive bars 80 are fabricated from copper or copper alloy. Due to magnetic fields created by the electrical currents passing through the stator windings 60, a current is induced in the electrically conductive bars 80. As a result, the electrically conductive bars 80 and rotor 70 are forced to move relative to their existing position, rendering the rotation of the rotor 70 and hence the shaft 39.

As illustrated, the rotor 70 includes end caps 82 extending around the end of the rotor 70. The end caps 82, one at each end of the rotor 70, electrically contact each of the electrically conductive bars 80. The end caps 82 are formed preferably as a ring and made from copper or a copper alloy. The rotor 70 further includes a capture ring 86 disposed within each of the end caps 82. The capture ring 86 is fastened to the rotor 70 by suitable means such as fasteners 88.

The second motor/generator 26 includes a rotor 90 extending longitudinally and about a shaft 91. The rotor 90 and shaft 91 are supported by bearings 92 disposed between the housing 30 and the shaft 91. The end of the shaft 91 is disposed in a recess 93 of the shaft 39 and rotatably supported by a bushing 93a. The rotor 90 includes a plurality of slots 98 and electrically conductive bars 100 forced therein. The electrically conductive bars 100 are fabricated from copper or a copper alloy. Due to magnetic fields created by the electrical currents passing through the stator windings 60, a current is induced in the electrically conductive bars 100. As a result, the electrically conductive bars 100 and rotor 90 are forced to move relative to their existing position, rendering the rotation of the rotor 90 and hence the shaft 91. It should be appreciated that the electrically conductive bars 100 are similar to or the same as the electrically conductive bars 80.

As illustrated, the rotor 90 includes end caps 102 extending around the end of the rotor 90. The end caps 102, one at each end of the rotor 90, electrically contact each of the electrically conductive bars 100. The end caps 102 are formed preferably as a ring and made from copper or copper alloy. The rotor 90 further includes a capture ring 106 disposed within the end caps 102. The capture ring 106 is fastened to the rotor 90 by suitable means such as fasteners 108.

Coolant fluid is also used to cool the rotors 70 and 90. Coolant fluid is received through a fluid conduit 110 in a cap 112 which is secured to the housing 30 by suitable means such as fasteners 114. Coolant fluid exits the flow path through a fluid conduit 117 extending through the housing 30. A fluid channel 118 in the shafts 91 and 39 provides a pathway through which the fluid passes between the fluid conduits 110 and 117 and a channel ring 119. The channel ring 119 is disposed on each end of the rotors 70 and 90 and secured thereto by the end caps, capture rings and fasteners. The channel ring 119 includes a channel 120 extending radially for the fluid. The rotors 70 and 90 each include a channel 122 extending axially therethrough for fluid flow between the channels 120. It should be appreciated that a pump (not shown) pumps cooling fluid from a fluid reservoir (not shown) through an external heat exchanger (not shown) to one of the fluid conduits 110 or 117, through channels 118, 120 and 122, to cool the rotors 70 and 90, and then back to the fluid reservoir (not shown).

The second clutch 24 includes an inner member 130 disposed about and connected to the shaft 91 by suitable means such as a spine connection. The second clutch 24 also includes an outer member 132 connected to an accessory drive gear 134. The accessory drive gear 134 is connected to the shaft 39 by suitable means such as a spine connection. It should be appreciated that the accessory gear 134 rotates with the shaft 39 to move a belt, chain or another gear (not shown) extending through the housing 30, in turn, rotating a gear or pulley (not shown) to drive accessory systems (not shown).

The second clutch 24 includes a control member 136 disposed about the inner member 130 and moveable axially therealong and a dog member 138 disposed between the inner member 130 and outer member 132 and engaged and disengaged by the control member 136. The second clutch 24 includes a lever 140 extending through an aperture (not shown) in the housing 30. The second clutch 24 includes an actuator 142 such as a linear actuator to move the lever 140 axially, in turn, moving the control member 136 to open (disengage) and close (engage) the second clutch 24. It should be appreciated that the second clutch 24 is of a dog clutch type to couple or uncouple the shafts 39 and 91 together.

The final drive unit 28 includes a gear 144 such as a spur gear connected to the shaft 91 of the second motor/generator 26 by suitable means such as a spline connection. The final drive unit 28 also includes a belt, chain or another gear 146 in engagement with the gear 144 and another gear 148 disposed about a shaft 150 supported at each end by bearings 152 in the housing 30. The gear 148 is in engagement with a gear 154 attached to a differential carrier unit, generally indicated at 156, illustrated in FIG. 3B. The differential carrier unit 156 includes a pair of inboard axles 158 supported by tapered roller bearings 160 disposed in the housing 30 and connected to wheels of the hybrid motor vehicle 10. The differential carrier unit 156 also includes a center gear pin 162 and center gears 164 attached to each end of the center gear pin 162. The differential carrier unit 156 further includes axle gears 166 attached to one end of each of the inboard axles 158. Gear 154, attached to the differential carrier unit 156, causes the carrier unit to rotate about the inboard axles 158 centerline, supported by bearings 160. The carrier rotation causes the center gear pin 162 to move the center gears 164, which are meshed with the axle gears 166. Equal resistive forces from the axles 158 cause the gears in the differential carrier to rotate without relative motion to each other, propelling the vehicle. When the resistive forces are unequal from the axles 158, the center gears 164 turn about the center gear pin 162 axis, thus providing differential speed output to the axles 158. It should be appreciated that rotation of the shaft 91 rotates the gear 144, in turn, rotating the gear 146, shaft 150, gear 148, and gear 154 of the differential carrier unit 156.

Referring to FIG. 4, various vehicle modes for the hybrid motor vehicle 10 are illustrated for state of the vehicle 10 versus the state of component operations or propulsion system modes of the hybrid powertrain system 14. In operation, when the hybrid motor vehicle 10 is stopped, the heat engine 12 may be idle, OFF or running, depending on several vehicle conditions such as the energy storage device 22 level, component temperatures or other inputs. At idle of the heat engine 12, the first clutch 18 and second clutch 24 are open (not engaged) and the first motor/generator 20 and second motor/generator 26 are OFF. When the heat engine 12 is OFF, the first clutch 18 may be open or closed and the second clutch 24 open and the first motor/generator 20 and second motor/generator 26 OFF. At running of the heat engine 12, the first clutch 18 is closed for rotating the shaft 39, charging the energy storage device 22 by the first motor/generator 20 and/or powering accessories through the accessory drive gear 134. The second clutch 24 is open or disengaged and the second motor/generator 26 is OFF.

For low speed and light acceleration, the heat engine 12 may be idle, OFF or running depending on the energy storage device 22 level. At idle of the heat engine 12, the first clutch 18 and second clutch 24 are open and the first motor/generator 20 is OFF. The second motor/generator 26 is used to motor or accelerate the hybrid motor vehicle 10 with power from the energy storage device 22. When the heat engine 12 is OFF, the first clutch 18 may be open or closed and the second clutch 24 open. The first motor/generator 20 is OFF and the second motor/generator 26 is used to motor or accelerate the hybrid motor vehicle 10 with power from the energy storage device 22. At running of the heat engine 12, the first clutch 18 is closed and first motor/generator 20 is charging the energy storage device 22 and/or powering accessories through accessory drive gear 134. The second clutch 24 is open and the second motor/generator 26 is used to motor the vehicle 10 with power from the energy storage device 22.

For low speed and heavy accelerations, the heat engine 12 is at idle or OFF. The first clutch 18 is open and the second clutch 24 is closed or engaged. Both the first and second motor/generators 20 and 26 are used to drive and accelerate the hybrid motor vehicle 10 with power from the energy storage device 22.

For low speed cruise, the heat engine 12 is OFF or running, depending on the need for charging the energy storage device 22. At heat engine 12 OFF, the first clutch 18 is open or closed and the first motor/generator 20 is OFF. The second clutch 24 is open and the second motor/generator 26 propels the hybrid motor vehicle 10 with power from the energy storage device 22. At heat engine 12 running, the first clutch 18 is closed and the first motor/generator 20 is charging the energy storage device 22 and/or powering accessories through the accessory drive gear 134. The second clutch 24 is open and the second motor/generator 26 propels the hybrid motor vehicle 10 with power from the energy storage device 22.

For high speed cruise, the heat engine 12 is running and both the first clutch 18 and second clutch 24 are closed, thereby connecting the heat engine 12 directly to the final drive unit 28 and propelling the hybrid motor vehicle 10. Both the first motor/generator 20 and second motor/generator 26 are OFF, having almost no drag on the hybrid powertrain system 14. Under certain circumstances, the first motor/generator 20 may be charging the energy storage device 22 if the energy level is low. Accessories are powered through the accessory drive gear 134 if required.

For high speed acceleration, the high speed acceleration mode is similar to the high speed cruise mode except that either the first motor/generator 20 and/or the second motor/generator 26, depending on need, are used as motors with power from the energy storage device 22 to supplement the engine power.

During the deceleration mode, the heat engine 12 is OFF, idle or running, depending on the need for charging the energy storage device 22. At a first idle and OFF state of the heat engine 12, the first clutch 18 is open and closed, respectively. The first motor/generator 20 is OFF and the second clutch 24 is open. The second motor/generator 26 is charging the energy storage device 22, regenerating power from vehicle motion into stored energy. At a second idle and OFF state of the heat engine 12, the first clutch 18 is open and the second clutch 24 is closed. Both the first and second motor/generators 20 and 26 are charging the energy storage device 22 from regenerated power. At engine running, the first clutch 18 is closed and the second clutch 24 is open. The first motor/generator 20 is charging the energy storage device 22 from power of the heat engine 12. The second motor/generator 26 is charging the energy storage device 22 from regenerated power from vehicle kinetic energy.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A hybrid powertrain system for a motor vehicle comprising:

a heat engine;

a first motor/generator having a rotor with a rotor shaft, the rotor shaft having first and second opposite ends;

a first clutch operatively connected between an output shaft of said heat engine and the first end of the rotor shaft of said first motor/generator;

a second motor/generator having a rotor with a rotor shaft, the rotor shaft having first and second opposite ends;

a second clutch operatively connected between the second end of the rotor shaft of said first motor/generator and the first end of the rotor shaft of said second motor/generator;

a final drive unit operatively connected to the second end of the rotor shaft of the second motor/generator;

a battery; and a control unit for selectively controlling the heat engine and the first and second clutches, and for selectively connecting the battery to the first and second motor/generators, wherein during low vehicle speeds, the first clutch may be closed and the second clutch may be opened for permitting the heat engine to drive the first motor/generator for recharging the battery and for permitting only the second motor/generator to propel the vehicle, and during high vehicle speeds, both of the first and second clutches may be closed for propelling the vehicle by the engine and the first and second motor/generators.

2. A hybrid powertrain system as set forth in claim 1 including a gearset interconnecting the heat engine and said first clutch.

3. A hybrid powertrain system as set forth in claim 2 wherein said gearset is a planetary gearset.

4. A hybrid powertrain system as set forth in claim 2 including a ring gear used in conjunction with a planetary gear of said gearset.

5. A hybrid powertrain system as set forth in claim 1 including means for matching operating speeds of the heat engine with the operating speeds of the first motor/generator and second motor/generator.

6. A hybrid motor vehicle as set forth in claim 1 wherein said heat engine is an internal combustion engine.

* * * * *